United States Patent
Ezra et al.

(10) Patent No.: US 6,807,619 B1
(45) Date of Patent: Oct. 19, 2004

(54) ADVANCING BANK POINTER IN PRIME NUMBERS UNIT

(75) Inventors: Josef Ezra, Ashland, MA (US); Yedidia Atzmony, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 201 days.

(21) Appl. No.: 10/235,137

(22) Filed: Sep. 5, 2002

Related U.S. Application Data

(63) Continuation-in-part of application No. 10/080,321, filed on Feb. 21, 2002.

(51) Int. Cl.[7] .............................................. G06F 12/00
(52) U.S. Cl. ..................... 711/219; 711/130; 711/133; 711/144; 711/154; 711/156; 711/159
(58) Field of Search ................................ 711/219, 130, 711/133, 144, 154, 156, 159

(56) References Cited

U.S. PATENT DOCUMENTS

| | | | | |
|---|---|---|---|---|
| 5,206,939 A | * | 4/1993 | Yanai et al. .................... | 711/4 |
| 5,381,539 A | * | 1/1995 | Yanai et al. ................. | 711/133 |
| 5,592,432 A | * | 1/1997 | Vishlitzky et al. ..... | 365/230.03 |
| 5,649,143 A | * | 7/1997 | Parady ........................ | 711/220 |
| 5,778,394 A | * | 7/1998 | Galtzur et al. .............. | 707/205 |
| 5,829,051 A | * | 10/1998 | Steely et al. ................ | 711/216 |
| 5,845,147 A | * | 12/1998 | Vishlitzky et al. ............ | 710/5 |
| 5,857,208 A | * | 1/1999 | Ofek ......................... | 707/204 |
| 6,049,849 A | * | 4/2000 | Arimilli et al. ............. | 711/133 |
| 6,145,057 A | * | 11/2000 | Arimilli et al. ............. | 711/133 |
| 6,594,742 B1 | * | 7/2003 | Ezra ........................... | 711/159 |
| 6,728,836 B1 | * | 4/2004 | Lambright et al. ......... | 711/129 |

* cited by examiner

*Primary Examiner*—Stephen Elmore
(74) *Attorney, Agent, or Firm*—Choate, Hall & Stewart

(57) ABSTRACT

The cache arrangement includes a cache that may be organized as a plurality of memory banks in which each memory bank includes a plurality of slots. Each memory bank has an associated control slot that includes groups of extents of tags. Each cache slot has a corresponding tag that includes a bit value indicating the availability of the associated cache slot, and a time stamp indicating the last time the data in the slot was used. The cache may be shared by multiple processors. Exclusive access of the cache slots is implemented using an atomic compare and swap instruction. The time stamp of slots in the cache may be adjusted to indicate ages of slots affecting the amount of time a particular portion of data remains in the cache. Associated with each processor is a unique extent increment used to determine a next location for that particular processor when attempting to locate an available slot.

38 Claims, 16 Drawing Sheets

ADVANCING BANK POINTER IN PRIME NUMBERS UNIT

RELATED APPLICATIONS

This application is a continuation-in-part of pending U.S. patent application Ser. No. 10/080,321, filed on Feb. 21, 2002, which is incorporated by reference herein.

BACKGROUND

1. Technical Field

This application generally relates to a computer system, and more particularly to techniques used in a cache within a computer system.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one Qr more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a relatively lower data access time than the disk drive. Data that is accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host system requesting the data.

Data may be stored in a cache in order to increase efficiency. However, there can be a cost associated with performing cache management operations, such as storing and retrieving data from the cache.

One technique for implementing a cache is to store the data in blocks and link each of the blocks together in a doubly linked ring list referred to herein as a replacement queue. Each block of the replacement queue represents a block of data from a logical disk unit. The blocks or slots are placed in the doubly linked ring list in the order in which they are retrieved from the disk. A pointer may point to the block that was most recently added to the list. Thus, when a new block is to be added to the cache within the replacement queue, the structure of the replacement queue, in combination with the head pointer, may be used to determine the oldest block in the replacement queue that is to be removed to make room for the new block. An implementation of the replacement queue may use both a "head" pointer and a "tail" pointer identifying, respectively, the beginning and end of the replacement queue. The "tail" may determine the oldest block or slot in the replacement queue. Two such pointers may be used in an replacement queue arrangement as it may be desirable in accordance with cache management schemes in which some data may remain permanently in the cache and the "oldest" and "newest" data may not be adjacent to one another. Cache management techniques are described, for example, in issued U.S. Pat. No. 5,381,539, Jan. 10, 1995, entitled "System and Method for Dynamically Controlling Cache Management", Yanai et al., assigned to EMC Corporation of Hopkinton, Mass., which is herein incorporated by reference, in which a data storage system has a cache controlled by parameters including: (a) a minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory containing the previously used tracks or data records are reused or recycled and new data written to these locations. The cache memory is in a least-recently used circular configuration in which the cache management system overwrites or recycles the oldest or least recently used memory location. The cache manager provides monitoring and dynamic adjustment of the foregoing parameters.

Described in issued U.S. Pat. No. 5,592,432, Jan. 7, 1997, entitled "Cache Management System Using Time Stamping for Replacement Queue", Vishlitzky et al., which is herein incorporated by reference, is a system that includes a cache directory listing data elements in a cache memory and a cache manager memory including a replacement queue and data structures. A cache manager determines which data element should be removed or replaced in the cache memory based on the elapsed time the data element has been in the memory. If the elapsed time is less than a predetermined threshold, the data element will be maintained in the same location in the replacement queue saving a number of cache management operations. The predetermined threshold is established as the average fall through time (FTT) of prior data elements in the memory. A modified least-recently-used replacement procedure uses time stamps indicating real or relative time when a non-write-pending data element was promoted to the tail of the replacement queue, the most-recently used position. Also disclosed is another embodiment in which the number of times the data element is accessed while in the memory is compared to a fixed number. If the data element has been accessed more than the fixed number, it is placed at the tail of the replacement queue ensuring a longer period for the data element in the memory.

Described in U.S. Patent Application No. 5,206,939, Apr. 27, 1993, entitled "System and Method for Disk Mapping and Retrieval", Yanai et al, which is herein incorporated by reference, is a device-by-device cache index/directory used in disk mapping and data retrieval.

Different techniques may be used to manage the cache, for example, in determining an available slot when inserting a new element into the cache. An executing processor may make multiple attempts at different slots before locating one which can be used to store new data in the cache. In systems having multiple processors, it may be desirable to have efficient techniques which seek to reduce the number of "collisions" between processors trying to obtain an available slot such that two processors don't attempt to access the same slot or same set of slots.

SUMMARY OF THE INVENTION

In accordance with one aspect of the invention is a method executed in a computer system for determining a plurality of increment values associated with a predetermined range of values for a plurality of processors. A plurality of unique values is determined. Each of the plurality of unique values is one of: greater than and equal to a predetermined minimum value in which the predetermined range is represented from "0" to "n-1" inclusively. Each of the plurality of unique values is one of: a prime number with respect to "n" such that "n" is not divisible by any one of said plurality of unique values, "n" being one of: greater than and equal to twice said prime number, and a value "k" having an associated set of factors of "k" and "n-k" such that each factor in the set is greater than the predetermined minimum value and each of the factors is unique with respect to every other factor of all other sets of factors associated with all others of said plurality of unique values, and "k" is less than "n".

In accordance with another aspect of the invention is a computer program product for determining a plurality of increment values associated with a predetermined range of values for a plurality of processors. The computer program product includes machine executable code that determines a plurality of unique values, each of the plurality of unique values being one of: greater than and equal to a predetermined minimum value, the predetermined range being represented from "0" to "n-1" inclusively. Each of the plurality of unique values is one of: a prime number with respect to "n" such that "n" is not divisible by any one of the plurality of unique values, "n" being one of: greater than and equal to twice said prime number, and a value "k" having an associated set of factors of "k" and "n-k" such that each factor in the set is greater than the predetermined minimum value and each of the factors is unique with respect to every other factor of all other sets of factors associated with all others of the plurality of unique values, "k" being less that "n".

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
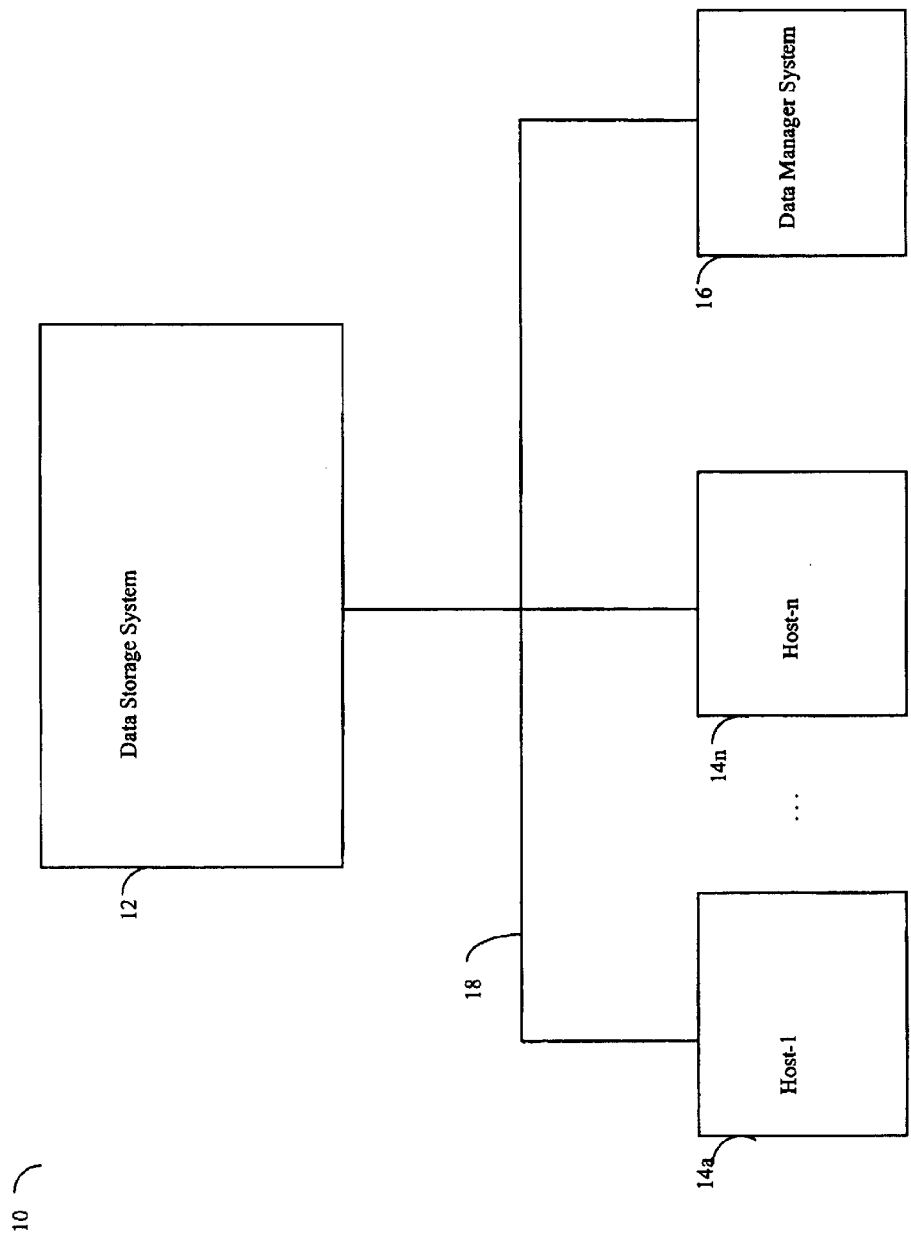
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Figure 2:
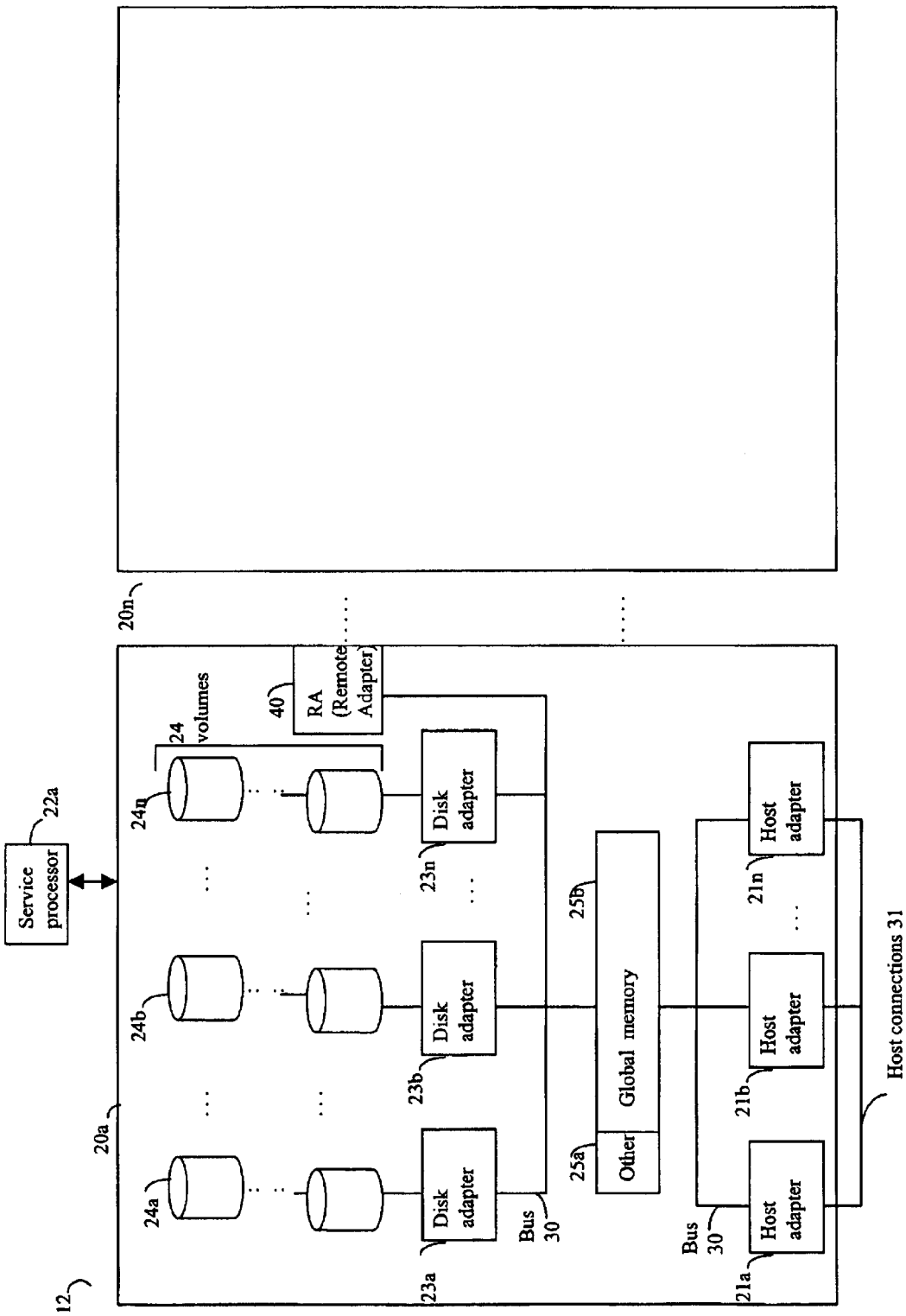
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix™ data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix™ data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with 10 operations in connection with multiple LVs that may reside on a disk. The DA may accomplish this by creating job records for the different LVs associated with the particular DA. These different job records may be associated with the different LVs in a data structure stored and managed by each DA.

As described above, an embodiment may include a cache in the global memory portion 25b of FIG. 2. An embodiment may include a single or multiple replacement queue arrangement in the cache. An example of an embodiment that includes a cache using multiple replacement queues is described in pending U.S. patent application Ser. No.09/535,134, U.S. Pat. No. 6,728,836, entitled "Segmenting Cache to Provide Varying Service Levels", filed Mar. 24, 2000, and assigned to EMC Corporation of Hopkinton, Mass. An example of a system with a single cache memory is described in issued U.S. Pat. No. 5,381,539, Yanai et al., entitled "System and Method for Dynamically Controlling Cache Management", and also assigned to EMC Corporation of Hopkinton, Mass.

It should be noted that in an embodiment including a multiple replacement queue arrangement, there may be separate policies, decisions and data collections for one or more of the replacement queues in accordance with restrictions as to what devices use which of the replacement queues. This may vary with each embodiment.

Figure 3:
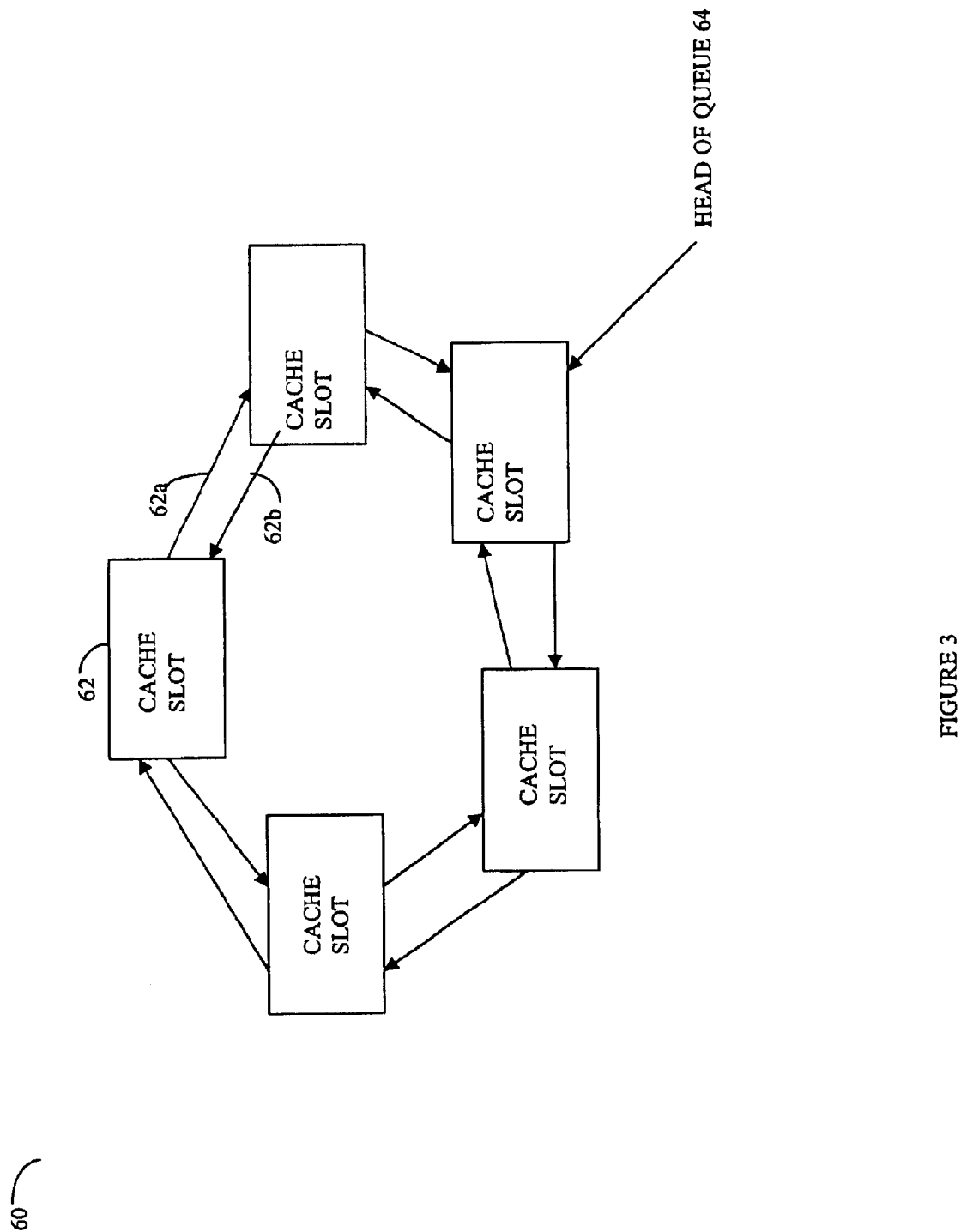
FIG. 3 is an example of an embodiment of a queue that may be used in implementing a cache.

Referring now to FIG. 3, shown is an example of an embodiment 60 of a replacement queue. Shown in the representation 60 is a circular structure in which each of the elements, such as 62, corresponds to a cache slot. Each cache slot may correspond to a portion of memory, such as one or more memory blocks. Each memory block may correspond to, for example, a track on one of the drives shown in connection with FIG. 2. In this representation, each of the slots are connected to other slots by forward and backward pointers, such as 62a and 62b, in a doubly linked list arrangement. Additionally, the head or beginning of the replacement queue is designated by a head pointer 64.

It should be noted that as described herein, an embodiment may include a cache which is in the form of the replacement queue using doubly linked list or other data structures known to those of ordinary skill in the art. The replacement queue described herein should not be construed as a limitation to the techniques described herein. Additionally, it should be noted that an embodiment may use a least-recently-used or other technique in determining which slots remain in the cache and which ones are removed.

Figure 4:
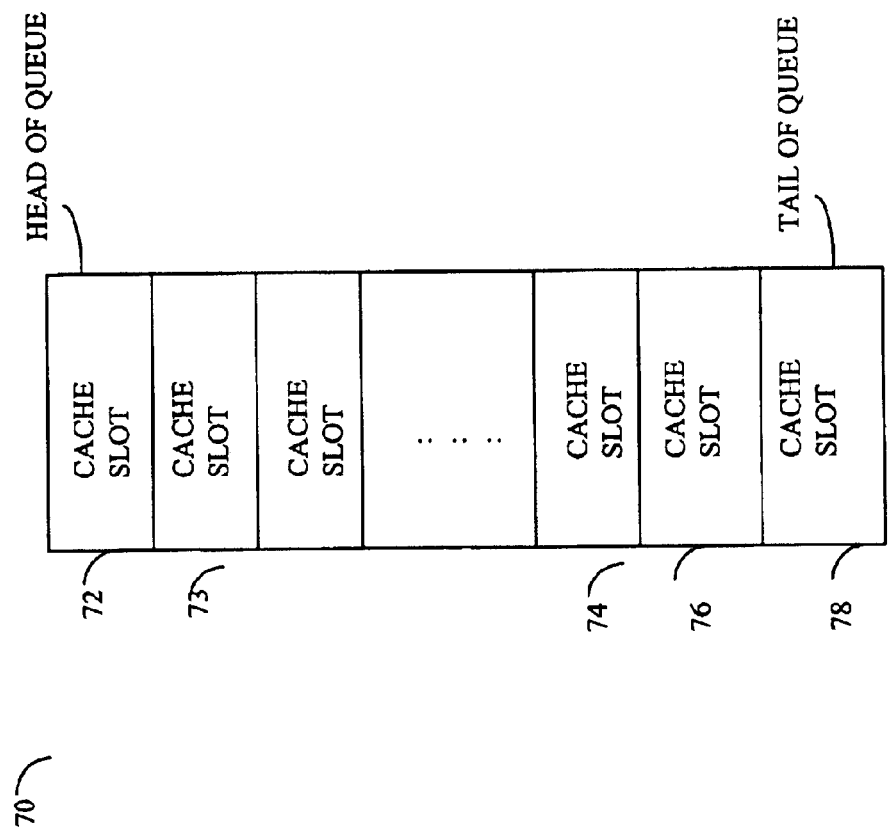
FIG. 4 is another representation of the queue of FIG. 3.

Referring now to FIG. 4, shown is an equivalent representation 70 of the previously described replacement queue 60 in connection with FIG. 3. The representation shown in FIG. 4 is a logical equivalent of the representation shown in FIG. 3. The representation 70 of FIG. 4 logically corresponds to that in FIG. 3 such that, for example, element 72 corresponds to the beginning cache slot as noted by the head of the replacement queue pointer 64 in connection with the previously described figure. Similarly, the last element of the replacement queue is denoted by slot 78 which in this example is labeled also as the tail of the replacement queue. Elements or slots may be inserted into the list at the head of the replacement queue and exit or leave the cache at the tail of the replacement queue. For example, when an element is deposited into the cache, it may be placed at the head of the replacement queue in slot location denoted by 72 in connection with a read operation. Additional elements may be progressively added to the head portion or other location within the replacement queue 72. As elements are added to the queue, subsequent elements progress toward the tail of the list. When another slot is added to the replacement queue at position 72, the slot currently at position 72 moves to that slot designated as position 73 and the newly added element falls into the position of element 72.

An element may be placed in the replacement queue, for example, when an element is referenced in connection with an I/O operation such as a cache miss for a read operation, or in connection with processing pending write operations, for example. Once in the replacement queue, an element progresses through the replacement queue from the head 72 towards the tail 78 of the replacement queue.

The foregoing queue arrangement in connection with a cache or shared memory may have drawbacks. For example, exclusive access to the queue may be implemented using a locking mechanism that only allows a single process to access the entire queue. Additionally, pointer manipulation in connection with performing management operations may also be expensive. These are described in more detail elsewhere herein.

Figure 5:
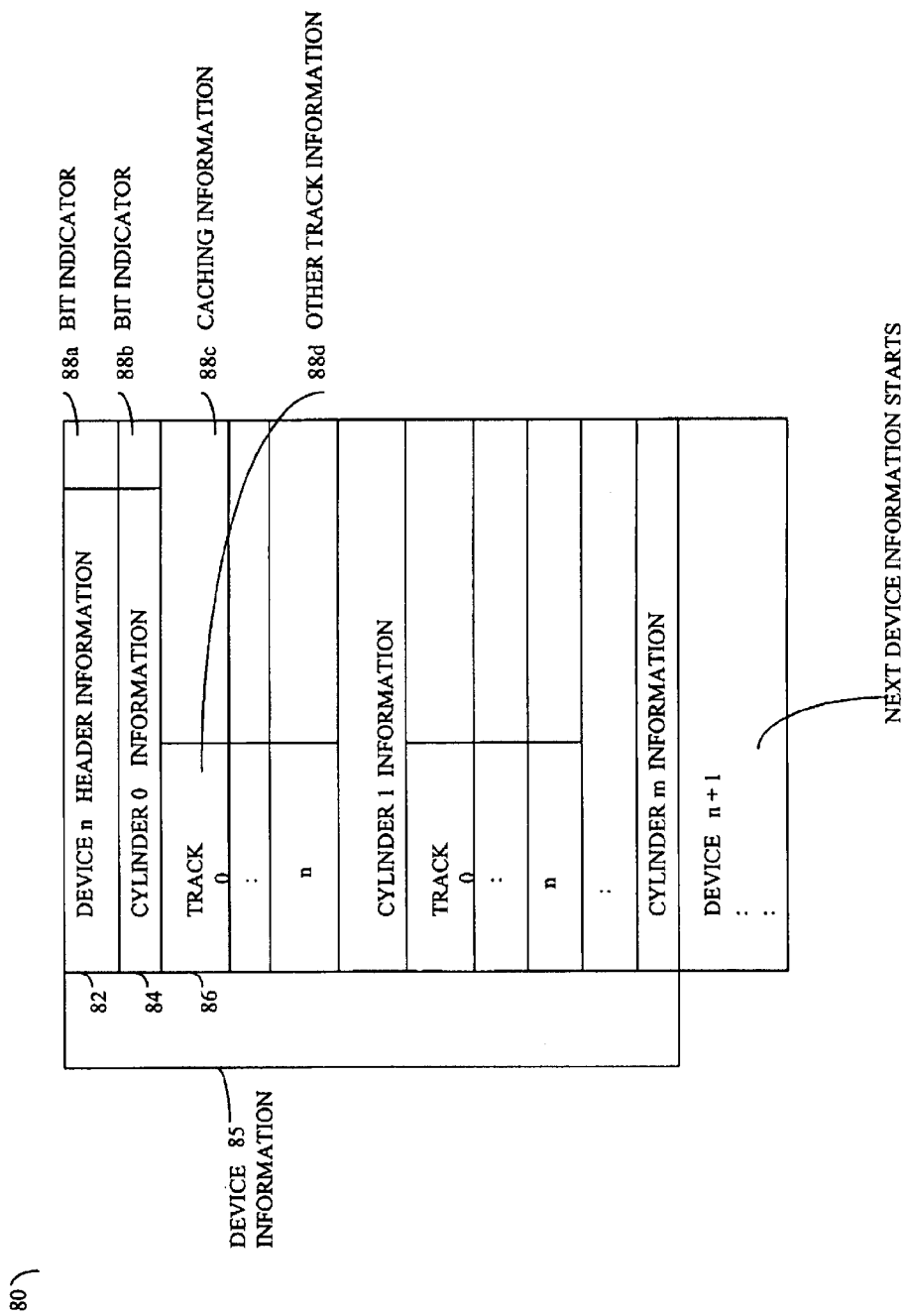
FIG. 5 is an example of an embodiment of a cache index or directory.

To indicate the data that is stored in the cache, a cache index or directory may be used. An embodiment may implement this using any one of a variety of different arrangements and structures. FIG. 5 shows one particular representation illustrating a device-by-device cache mapping.

Referring now to FIG. 5, shown is an example of a representation of a cache index/directory table. The table 80 may be organized on a device-by-device level to indicate for a particular portion of a device, is the portion in cache, and if so, where in cache is it located. An embodiment that includes devices, for example, such as disks, may include a further refinement or granularity in the table 80 corresponding to a location in cache.

The table 80 may include a hierarchical structure relative to the structure of a disk, such as cylinders and tracks on a disk. Each device, such as device n, may have a corresponding portion 85 included in the table. Each of the portions 85 may further be divided into sections in accordance with the disk structure. A portion 85 may include device header information 82, information for each cylinder 84 and for each track within each cylinder 86. For a device, a bit indicator 88a may indicate whether data associated with the device is stored in cache. The bit indicator 88b may further indicate for a particular cylinder within a device, is any data stored in the cache. Associated with each track may be a corresponding portion 88c indicating whether data associated with a particular track is in the cache and an associated address of where in the cache the data for a particular track may be found, for example, in connection with performing a read operation or a pending write operation. The portion 88d may include other information associated with a particular track, such as a valid cache address if data is stored in the cache for the particular track.

Figure 6:
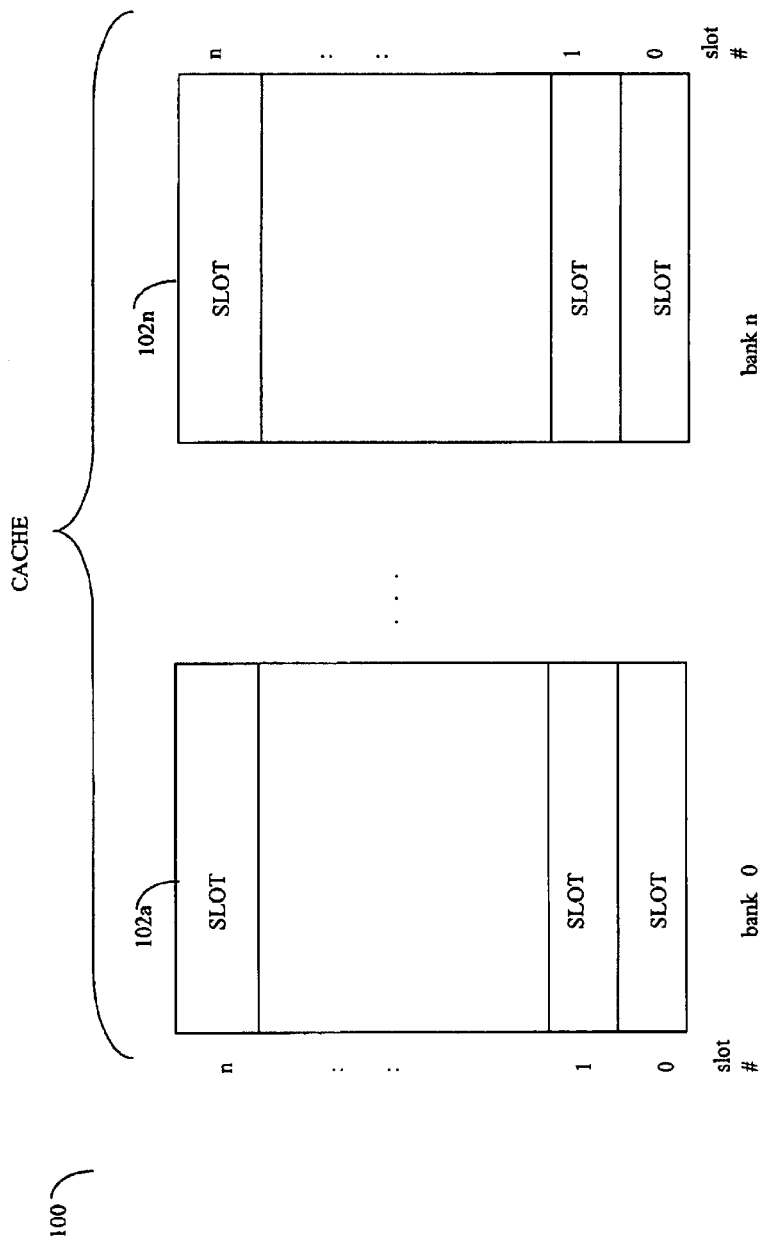
FIG. 6 is an example of an embodiment of a cache organization having a plurality of memory banks.

Referring now to FIG. 6, shown is an example of another representation of a cache in one embodiment. In this illustration, the cache 100 is organized into memory banks 102a–102n corresponding, respectively, to bank 0 through n. Each memory bank may be further divided into slots. Each memory bank, such as 102a, may include a control slot, such as 104a that includes information regarding the slots included in the respective memory bank.

It should be noted that the cache index or directory as shown in FIG. 5, for example, may be used in connection with any one or more of a variety of different cache arrangements, such as those in FIGS. 3 as well as FIG. 6.

Figure 7:
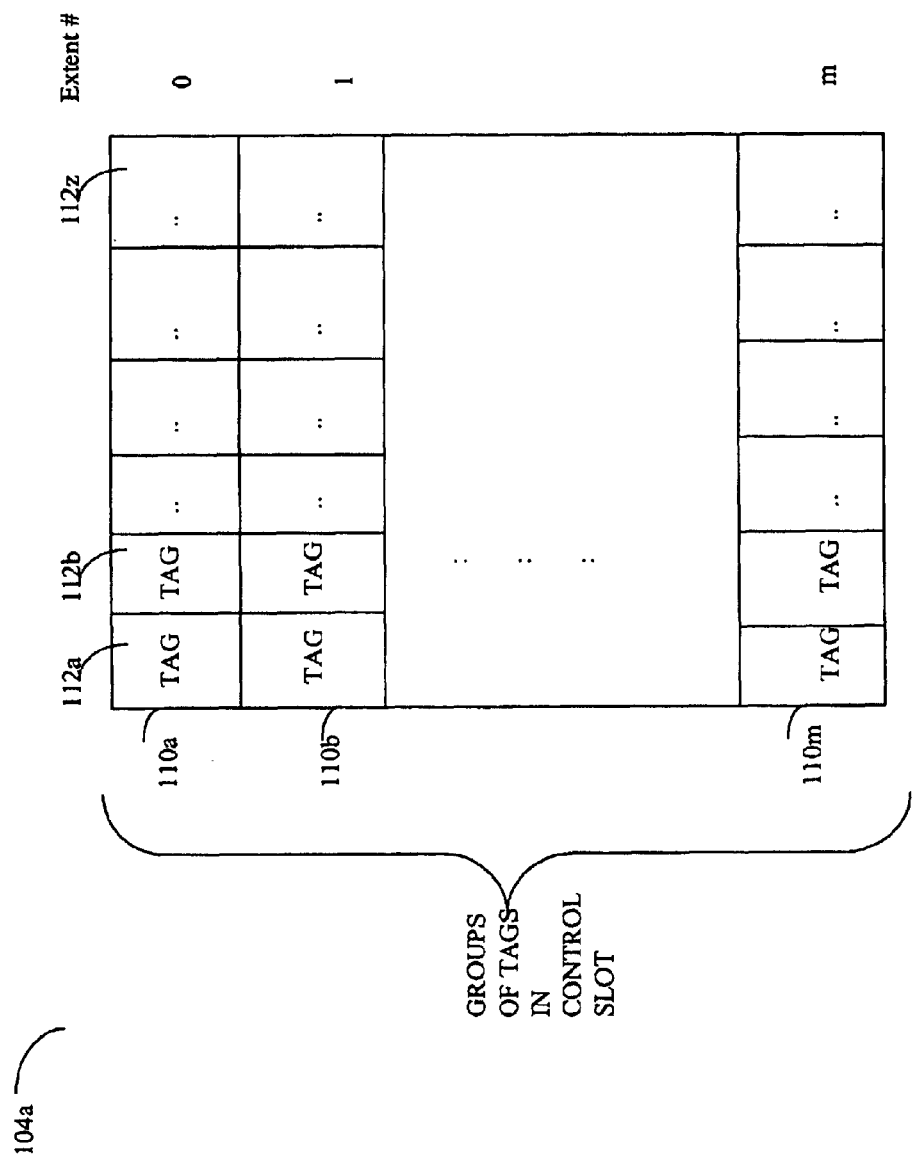
FIG. 7 is an example of an embodiment of a control slot associated with each memory bank.

Referring now to FIG. 7, shown is a more detailed description of the control slot 104a from FIG. 6. The control slot 104a may include information about the other slots in the memory bank. In this example, the control slot 104a may be further divided into extents or groups of tags, such as 110a–110m. Other slots in the memory bank 102a that includes control slot 104a may have a corresponding tag, such as 112a. In one embodiment, the tag size selected is 2 bytes or 16 bits. However, other tag sizes may be used in other embodiments. The tag may include information about the associated cache slot and is described in more detail in following paragraphs.

Each extent, such as 110a–110m, may refer to a number of tags that may vary in accordance with each embodiment. In one embodiment, the number of tags in an extent is the number of tags which may be read in a single direct memory access (DMA), for example, by a DA. Each chunk or portion may include, for example, 120 or 82 tags. Other numbers of tags may be associated with a single chunk or portion that may vary in accordance with each embodiment.

An embodiment may store the cache directory or table, cache, or portions thereof in global memory, for example, as included in FIG. 2 for a particular data storage system. Once in global memory, a DA may perform a DMA (direct memory access) and obtain a copy of a portion of the tags. The portion of the tags may be placed on another portion of memory local to the DA and utilization of this local copy is described in following paragraphs.

Figure 8:
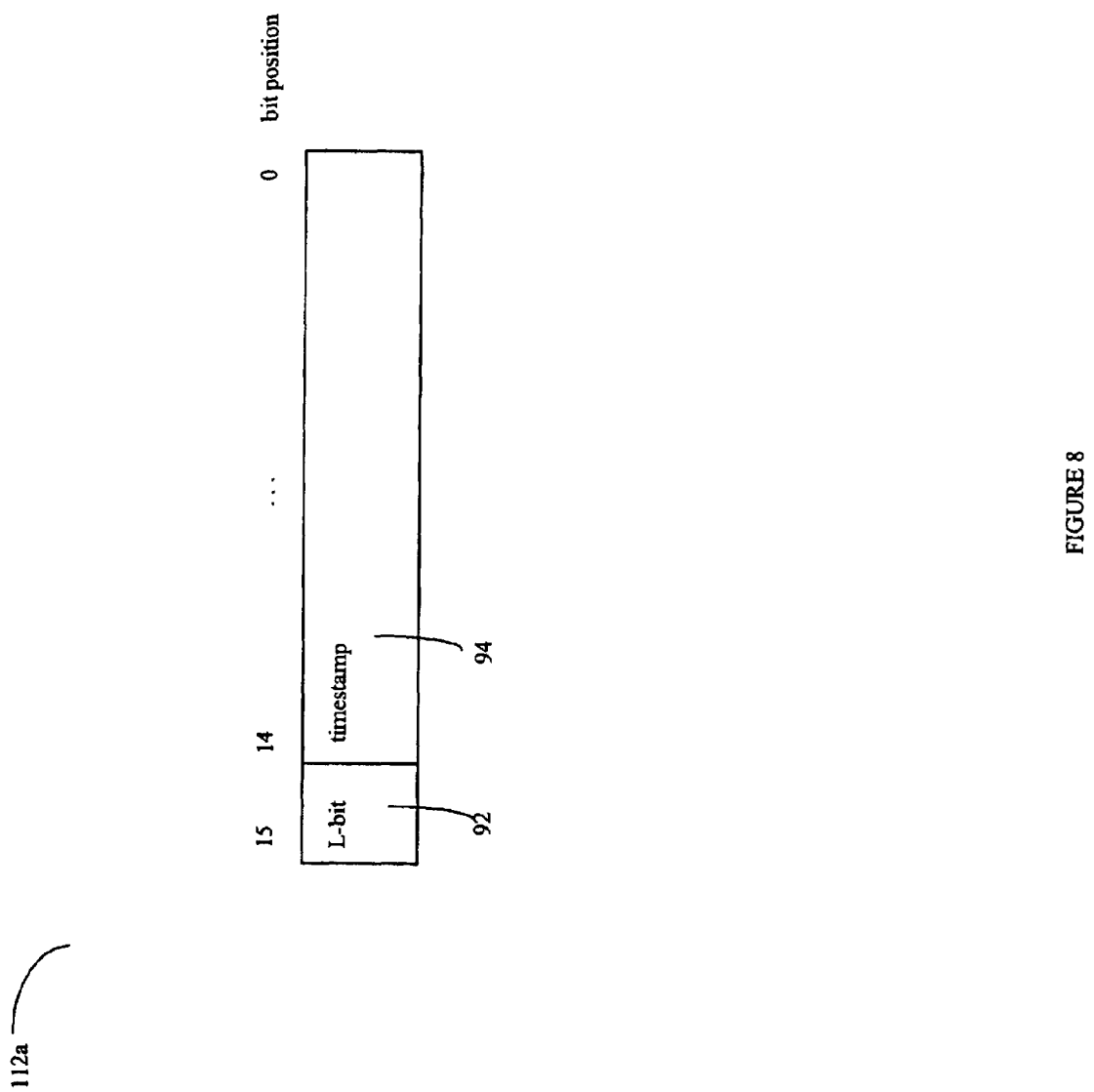
FIG. 8 is an example of a tag as included in the cache slot of FIG. 7.

Referring now to FIG. 8, shown is a more detailed representation of a tag 112a as included in FIG. 7. The 2 byte tag 112a includes an L-bit 92 and a 15 bit time stamp value 94. The L-bit, which may be the upper bit in the 2-byte tag arrangement, may be used to indicate the availability of a cache slot associated with the particular tag. This L-bit may be used in performing operations in which a processing step may be to obtain a cache slot. Associated processing operations are described in more detail elsewhere herein in following paragraphs. The time stamp value indicates, within a particular resolution, such as ½ second, when the associated slot was last used. For example, when there is a cache "hit" to a particular slot, the associated time stamp is updated with new time stamp value.

One technique may determine which slot to use, for example, by determining the age of each slot using the associated time stamp and selecting the oldest one. Additionally, an embodiment may also use a special time stamp value to indicate that a tag corresponds to a slot which is available and includes data that is not relevant. A tag corresponding to a slot including data that is not relevant may also be referred to as a scratch slot in a pool of available slots.

Data may be stored in the cache in connection with performing data operations. Different processing steps may be performed using the cache in connection with performing different data operations. For example, when a read request is received from a host computer, a determination may be made as to whether the requested data is in the cache. If so, the data is returned. Otherwise, the data may be read from the particular data storage device, stored in the cache and then sent to the host system. A slot from the cache is determined in which to store the data. When a write operation is performed, an embodiment may stored the data in the cache as a pending write which is actually written to memory at some later point in time in accordance with system specific policies. When the data is written to memory, a cache slot may be freed to be added to the pool of available or "free" slots. What will now be described are processing steps that may be performed in an embodiment in connection with cache management operations, for example, such as those just described for read and write operations.

Figure 9:
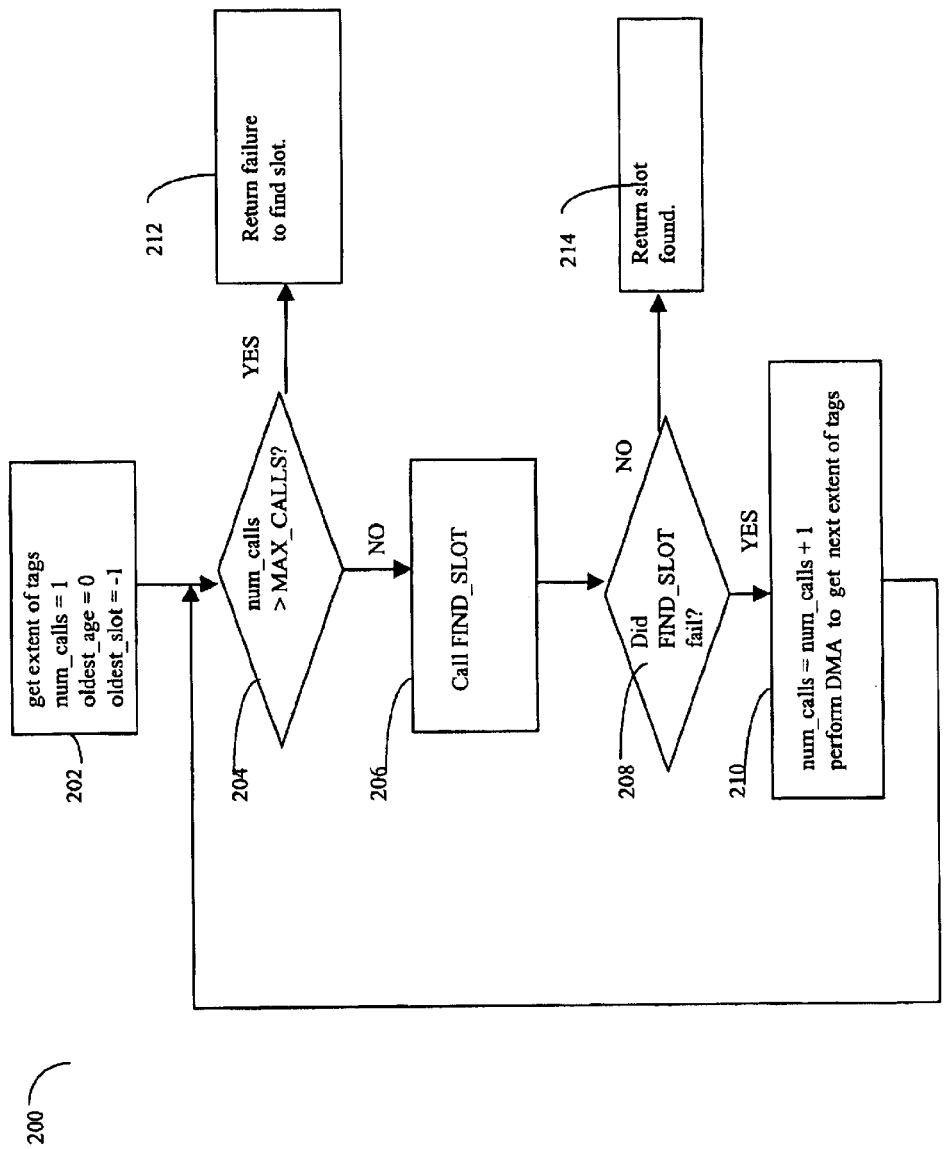
FIGS. 9–12 are flowcharts of processing steps of an embodiment for obtaining a cache slot.

Referring now to FIG. 9, shown is a flowchart of steps of an embodiment for obtaining a slot from the cache. Generally, the technique searches for an available slot or displaces the oldest slot. These steps may be performed by each DA or other processor, for example, within a system such as described in connection with FIG. 2.

At step 202, a first extent of tags is read from global memory and a local copy is made. Additionally, variable num_calls is initialized to 1, oldest_slot=−1 and oldest_age to 0. Num_calls tracks the number of times FIND_SLOT is called and fails after a predetermined number. Oldest_age tracks the age of the oldest slot and oldest_slot accordingly is an identifier corresponding to the oldest slot. Control proceeds to step 204 where a determination is made as to whether the number of calls exceeds a predetermined maximum, MAX_CALLS. If so, control proceeds to step 212 where a failure is returned. Otherwise, control proceeds to step 206 where a routine FIND_SLOT is called, which is described in more detail in following paragraphs. FIND_SLOT attempts to locate and return a cache slot for use. It should be noted that MAX_CALLS may be a predetermined value that may vary in accordance with each embodiment. For example, in one embodiment, MAX_CALLS is 100.

It should be noted that in connection with step 202, a new extent or portion of tags may be obtained with each invocation of steps of flowchart 200. Thus, each time each processor attempts to find a slot within an extent of tags, a new extent of tags is obtained. This technique may be used in connection with distributing the number of slots available for use in any particular extent to approximate a uniform distribution. It may be desirable to have a uniform distribution of the number of free slots in any particular extent. Using a new extent each time is one technique that may be used in connection with attempting to obtain the uniform distribution of slots available for use.

Additionally, when there are multiple processors each attempting to locate an available slot, techniques may be used in connection with determining the next subsequent extent of tags for each processor in order to minimize clustering. In other words, techniques may be used such that each processor attempts to locate an available slot from different extents of tags to minimize the likelihood that a first and a second processor look in the same extent of tags. Accordingly, these techniques may also minimize the likelihood that any two processors may be attempting to access the same available slot. Techniques for use with multiple processors, such as using a relative prime extent increment, are described elsewhere herein in more detail.

Experimentation by the inventors has shown that use of the foregoing techniques may result in a distribution of the number of free slots in any given extent of tags which approximates a uniform distribution as a best case and a normal distribution as a worst case.

Control proceeds to step 208 where a determination is made if FIND_SLOT succeeded or failed in locating a cache slot for use. If a slot is found, control proceeds to step 214 where the determined slot is returned. Otherwise, if FIND_SLOT failed, control proceeds to step 216 where num_calls is incremented by 1 and a global memory read is performed to get the next extent of tags. Control then proceeds to step 204 where processing then continues.

Figure 10:
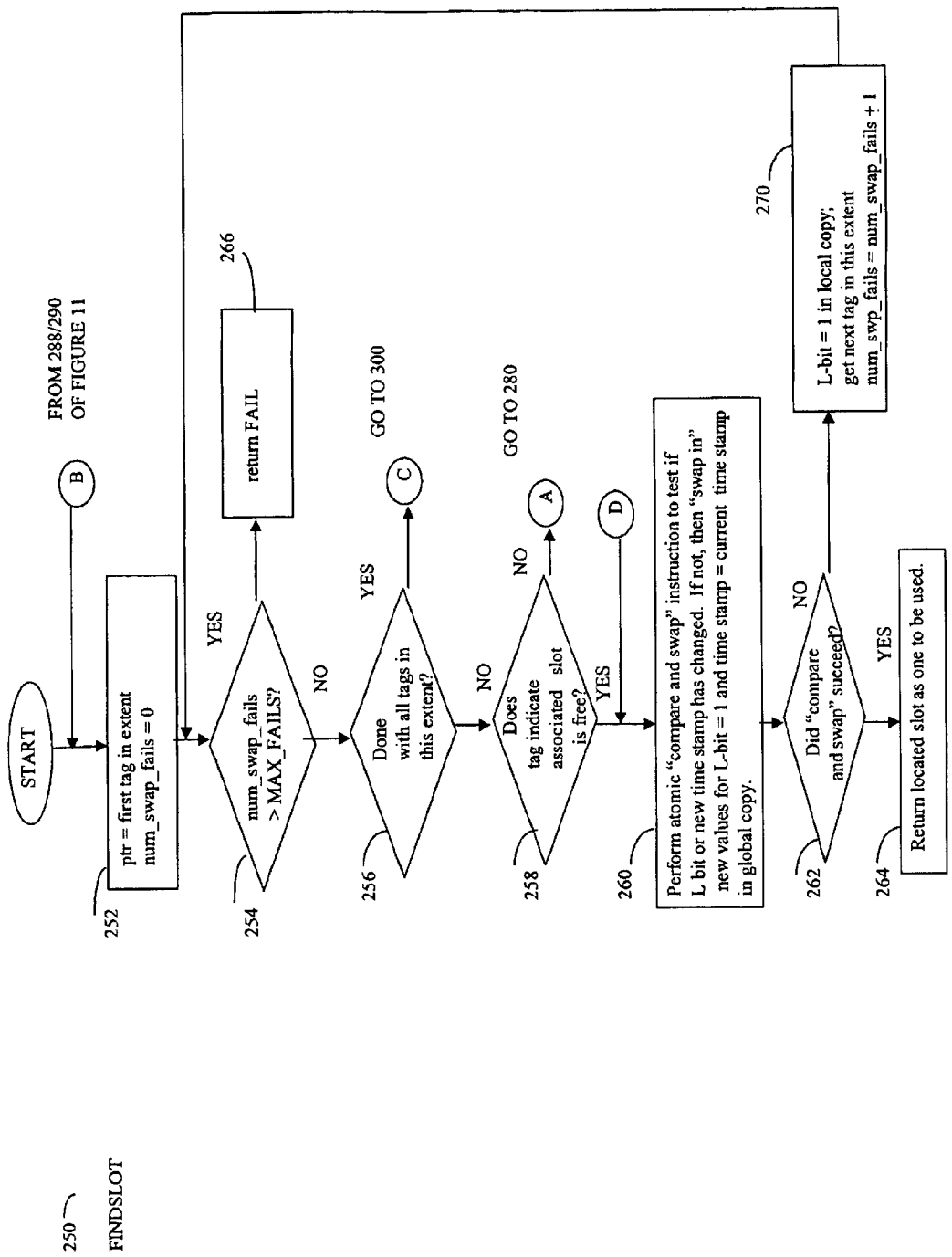

Referring now to FIG. 10, shown is a flowchart 250 of processing steps performed in connection with the FIND_SLOT routine. At step 252, ptr is assigned to point to the first tag in the current extent of tags. Additionally, the num_swap_fails tracking variable is initialized to 0. num_swap_fails counts the number of failed swaps as described in following paragraphs. At step 254, a determination is made as to whether num_swap_fails exceeds a predetermined maximum. In one embodiment, MAX_FAILS may be 4. Other embodiments may have other values for MAX_FAILS that may vary from that described herein. It should be noted that each DA, director or processor has its own unique ptr such that each DA, for example, may attempt to obtain a slot from locations different than that of other DAs. If a determination is made at step 254 that the maximum number of failed swap attempts has been exceeded, control proceeds to step 266 where failure is returned. Otherwise, control proceeds to step 256.

Figure 12:
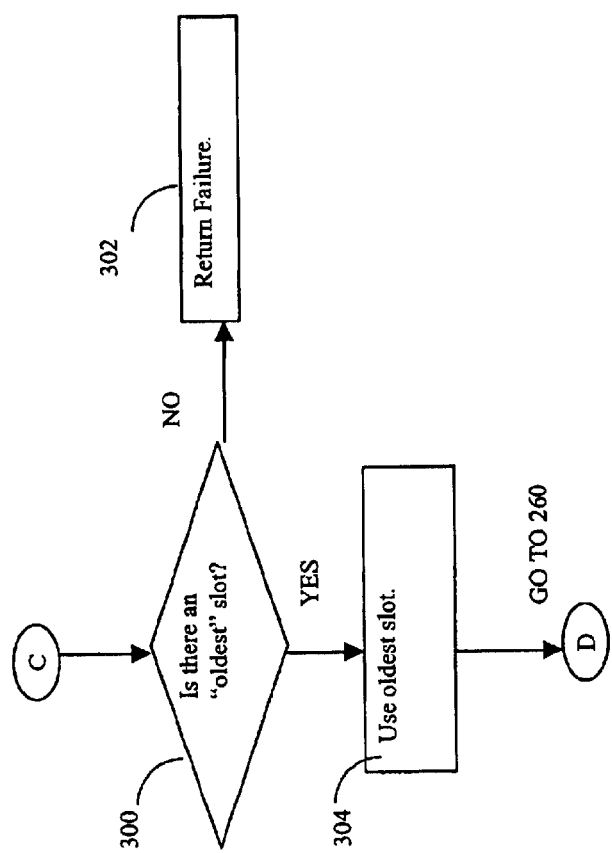

At step 256, a determination is made as to whether processing is complete for all tags in this extent. If so, control proceeds to step 300 in FIG. 12 where a determination is made as to whether there is an "oldest" slot. If so, this slot is used as the available slot, as in step 304, and control proceeds to step 260. Otherwise, control proceeds to step 302 where failure is returned.

If, at step 256, a determination is made that all tags in this extent have not been examined, in accordance with the local copy, control proceeds to step 258 where a determination is made as to whether the current slot identified by the current tag is free or available. In accordance with the embodiment described herein, this may be determined using the time stamp where a particular value may be placed in each time stamp field when a corresponding slot is returned to the pool of free or available slots. Any particular value may be used in an embodiment, such as a time stamp of 0, which may vary in accordance with each embodiment. If it is determined that the current slot is free, control proceeds to step 260 where an atomic operation may be performed. In one embodiment, this may be performed using an atomic "compare and swap" instruction which tests the L-bit and time stamp of the current tag to see if the values of either have changed since the determination at step 258. If the values have not changed, then the instruction also "swaps in" or updates values of the L-bit and time stamp fields by setting the L-bit to 1 and setting the time stamp to be that of the current time. It should be noted that this update of the current tag is performed to the copy in global memory. Additionally, the processing performed at step 260 is also performed using the copy from global memory.

Performing the compare and swap as an atomic, uninterrupted operation may be used to guarantee exclusive access to the shared resource of the cache or shared memory since, for example, multiple DAs may be attempting to access the same portion of shared memory, such as the same cache slot. The determination at step 258 may be performed, for example, by two different DAs reaching the same conclusion that a particular slot is available. However, only one of the DAs may actually be granted or obtain the slot since the atomic compare and swap operation may only be performed by one DA at a time in an uninterrupted fashion. The second DA's compare and swap will result in failure in that the values were changed by the first DA's successful execution of the compare and swap instruction.

The processing performed in connection with step 260 may be performed atomically using other instructions and/or techniques known to one of ordinary skill in the art, for example, in connection with accessing a shared resource such as the shared memory or cache as described herein. One example of the atomic performance or processing steps is the atomic "compare and swap" instruction which may be implemented in hardware and/or software. Another embodiment may utilize other techniques in performing an equivalent of this atomic operation by performing the following pseudo-code steps:

1. lock portion of shared resource
    2. if L bit or time stamp has changed
       then FAIL and unlock shared resource
       else /*SUCCESS*/
          swap in new values as in step 260
          unlock shared resource The foregoing may be implemented used different mechanisms and techniques included in a system for providing exclusive access to a shared resource, such as the shared memory used as the cache in this instance.

It should be noted that the granularity used in connection with the lock and unlocking of a resource may vary in accordance with each particular embodiment. For example, in one embodiment, a locking mechanism may be provided which locks a minimum of a word size. Other embodiments may have other limitations. It may be desirable to lock for exclusive access the smallest amount or unit allowable within limits of a particular system which is also the size of a tag or portion thereof being accessed by multiple processors.

At step 262, a determination is made as to whether the compare and swap instruction succeeded. If so, control proceeds to step 264 where the located slot is returned as the one to be used. Otherwise control proceeds to step 270 where the L-bit is set in the local copy so that this slot is not examined again. The next tag is obtained in the current extent and the num_swap_fails is incremented by 1. Control proceeds to step 254.

Figure 11:
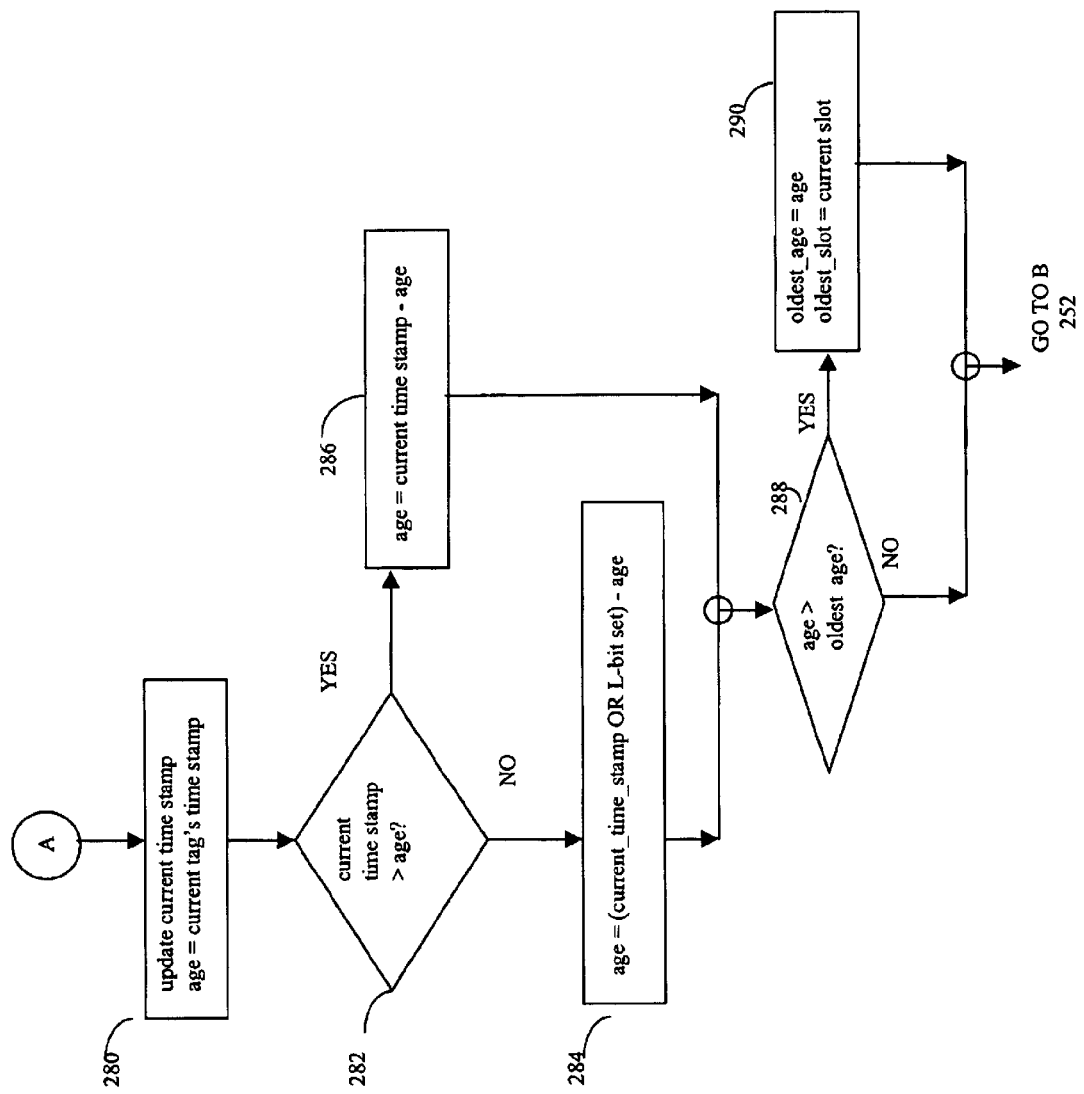

If a determination is made at step 258 that the current tag is not free, control proceeds to step 280 which is continued in FIG. 11. At step 280, the current time stamp is updated and the temporary variable age is assigned the current tag's time stamp value. It should be noted that the processing step of updating the current time stamp may be performed in any one of a variety of different increment units. For example, in one embodiment, current time stamp may be updated in increments of 4 units. In this example, multiple processors may be using the same cache in which each of the processors has its own clock and associated time used in connection with time stamps. Each of the processor clocks may have time synchronization differences such that at a particular point in time, time stamps produced by any two of the clocks may differ. A time stamp increment, such as 4 units, may be selected in accordance with any such synchronization differences when comparing or using time stamp values as in processing herein. In one embodiment, the increment is 4 units=2 seconds, each unit being ½ second. This increment amount may vary in accordance with embodiment.

At step 282, a determination is made as to whether the current time stamp is greater than the age. If so, control proceeds to step 286 where age=current time stamp−age. Otherwise, control proceeds to step 284 where age=(current time stamp OR L-bit set)−age.

The processing at steps 282, and 286 obtain an absolute value of the age of the current slot which is a difference of the amount of time from when the slot was last used subtracted from the current time. The processing of steps 282, 284 and 286 are used in connection with handling time stamp values which "wrap around" for very large values causing the L-bit to be set. When this point is reached, the age starts over at a new value similar to a counter which, when its maximum is reached, is reset.

Control proceeds to step 288 where a determination is made as to whether the age of the current slot is greater than the oldest_age of the slots visited thus far. If so, control proceeds to step 290 where information is retained about the current slot, such as updating the oldest_age and the corresponding identifier. Control then proceeds to step 252.

As data associated with a slot is moved in and out of cache, the cache index or directory, for example as illustrated in FIG. 5, may accordingly be updated.

It should be noted that in the foregoing embodiment using tags for cache management, a particular slot may be noted as "not available" is the L-bit is set (=1) in a global copy. A cache slot which is "not available" may be characterized as one that includes volatile data and should not be removed from the cache. Use of the L-bit as a technique for indicating when a slot is not available may be used to manage a shared cache, for example, rather than an using a cache implementation with linked lists and pointers as described elsewhere herein. Similarly, a slot may be indicated as "available" by clearing (=0) the L-bit. The associated time stamp may be set to any one of different values affecting when a particular slot may be selected for use. For example, the time stamp may be set to a value of 0 indicating that the data in the cache slot is invalid.

Adjusting the time stamp to different times may be used when freeing a cache slot, such as, for example, when setting the L-bit to 0. The time stamp may be set to a particular value to indicate an age of a slot. As described elsewhere herein, clearing the L-bit and resetting the time stamp to 0 in a global memory copy of a tag may be used to indicate that this slot should be selected prior to others having non-zero time stamps. A time stamp of zero in this instance may be used to indicate that the cache slot contains meaningless data. A non-zero time stamp may also affect when a particular cache slot is selected, for example, since the "oldest" cache slot may be selected from all time slots having non-zero time stamps. It should be noted that in a cache slot with an L-bit=0, a non-zero time stamp may be used to indicate that although the slot is "available", the slot does contain valid data that may also be used, for example, in connection with a write pending data portion that has been written out to disk and subsequently for some time the data still remains in the cache. Accordingly adjusting the time stamp may cause the age determination of the associated slot to vary. This technique may be used in connection with causing data in particular slots to remain in the cache for longer or shorter periods of time. This time stamp adjustment may be used, for example, as an alternative to physically inserting a slot at different points in a cache data structure, for example, such as in adjusting pointers in a linked list. Depending on techniques and policies that may be included in each embodiment, it may be desirable to have slots of data having particular characteristics remain in cache longer than other slots having other characteristics.

In particular, an embodiment may adjust the time stamp value of an associated slot in accordance with the Fall Through Time (FTT). Generally, the FTT refers to the average amount of time it takes for an unpromoted slot once it is in the queue to exit the queue. In other words, it is the average amount of time it takes a slot to pass through or "fall" through the queue from the head position and then exit out of the queue through the tail position, for example, referencing the illustration of FIG. 4. A slot may be added to the head position or at another position in accordance with the relative time stamps of those in the queue. The FIT is described in issued U.S. Pat. No. 5,592,432, Vishlitzky et al, which is incorporated herein by reference.

The FTT may be calculated for each slot by taking a first time stamp at the position when an element is lastly placed at the head of the replacement queue, and then taking a second time stamp value when that same slot exits the replacement queue (such as when a slot exits or leaves at the tail). The difference between the second ending time stamp value and the starting or first time stamp value for each particular slot may be used in calculating an average amount of time. It is this average amount of time that represents the FIT for a large number of slots.

It should be noted that in one embodiment of the foregoing, it was determined that the tags within each extent approximates a uniform distribution with respect to the time stamps.

An embodiment may provide different initial values for use with techniques described herein with different processors, for example, such as may be associated with a DA or other director. For example, in one embodiment, when determining the starting extent, each processor may begin with the first extent of a different memory bank. As additional extents are requested by each processor, a next subsequent extent may be obtained by updating the extent pointer address by an increment value also unique for each processor. For example, in one embodiment, each processor may have its own unique value and all the extent increments of all the processors may also be relatively prime. Additionally, the number of extents may not be a multiple of any prime number that is an increment extent value. The foregoing and other techniques may be used in an embodiment to minimize clustering of different processors in which different processors are attempting to obtain cache slots which are clustered together.

In one embodiment, each director or processor may have its own unique processor identifier number. This identifier number may be used in assigning an initial value for a starting extent for each processor. For example, each processor may be assigned an initial value of a starting extent number as follows:

for I=1 to max for all processors

```
for I = 1 to max for all processors
{
    current_proc_id = identifier of processor I;
    initial_extent_value_processor_pointer[I] =
        (number of extents in all banks * current_proc_id)/ (max number of
                                                              processors)
    I = I + 1
}
``` where I is an index over the range of all processors and each processor has an associated unique processor identifier. The initial value of a starting extent for each processor is selected in accordance with the unique processor identifier. In this embodiment, the memory may be organized into banks and number of extents in all banks refers to the total number of extents in all of the memory banks. As described elsewhere herein, each memory bank may include a particular number of extents that may vary in accordance with each embodiment. Another embodiment may use the processor identifier in connection with determining a random number used in selecting an initial value for each processor's starting extent.

In addition to selecting an initial value of a starting extent for each processor, an extent increment may be determined for how to select the next extent for each processor. In one embodiment, this increment may be the next sequential extent for each processor, for example, determined by adding a constant of one (1) to a current extent number. Other embodiments may use different techniques in determining the initial value of a starting extent and for an extent increment.

An embodiment may also utilize thresholds levels of available slots such that there is a minimum number of available slots. For example, in one embodiment, when the number of available slots (L-bit=0) falls below 20%, write pending operations are actually written to disk causing the associated cache slots to have the L-bit values cleared.

An embodiment may also use the foregoing cache management technique in a system which provides for also utilizing an alternate technique for cache management. This may be implemented, for example, utilizing a switch providing for selection of the foregoing technique or another, such as cache management using pointer manipulation.

The foregoing provides a flexible and efficient technique for cache management. Slots may be added or removed from the cache by updating values in an associated tag. Other embodiments may utilize pointer management techniques in accordance with particular data structure of the associate cache that may be more expensive in terms of execution time and memory. Exclusive access to the shared resource of the cache may be implemented utilizing the atomic instruction described herein or other equivalent. This may be used as alternative for a more expensive locking mechanism, for example, that may exclude all others from accessing any portion of the cache. It should be noted that the atomic instruction does not exclude all other from accessing the cache but rather guarantees performance of an atomic operation to a portion of the cache. Use of the foregoing techniques described herein may be more apparent in a system, for example, having a large number of processors accessing the shared memory, or those with a slow global memory access time.

It should be noted that the foregoing includes techniques used in connection with a portion of shared memory used as a cache. These techniques may also be used in connection with other types of shared resources.

Different techniques may be used in an embodiment in determining the extent increment described herein. In one embodiment, each director or processor may have it's own unique extent increment selected with the goal of minimizing the number of collisions between multiple processors and minimizing the amount of clustering between any two or more processors. That is, techniques may be used by a processor trying to find a slot, such as in connection with FIND SLOT processing, to minimize the occurrence of the processor accessing a slot which is currently being accessed and/or used by another processor.

In following paragraphs, techniques are described in determining an extent increment for each processor with a goal of reducing the number of collisions between any two processors or directors. A "collision" may be defined as the occurrence of two processors or directors each having an extent increment which yields the same current extent pointer at the same time. Consider, for example, two processors PROC1 and PROC2 each having an extent increment INC1 and INC2, respectively. Let "t" represent a number of steps in which, at each step, a processor's unique increment is added to the current extent pointer value associated with a processor. A collision occurs between PROC1 and PROC2 at a time "t" when both processors' current extent pointers are the same. The current value of PROC1's extent pointer at a time "t" may be represented as:

$$PROC1\_extent\ pointer=start\_value\_PROC1+(t*INC1)$$

where:

start_value_PROC1 is the starting extent pointer value for PROC1, and

PROC1_extent_pointer is the current extent pointer value for PROC1.

Similarly, the following current value of PROC2's extent pointer value at a time "t" may be represented as:

$$PROC2\_extent\ pointer=start\_value\_PROC2+(t*INC2)$$

A collision occurs between PROC1 and PROC2 processors or directors when:

$$start\_value\_PROC2+(t*INC2)=start\_value\_PROC1+(t*INC1)$$

at a time or a number of steps "t". One parameter of an embodiment may be the minimum acceptable distance or number of steps for an occurrence of a collision. The extent increments associated with processors or directors may be selected to ensure that this minimum desired collision rate is obtained. A minimum extent increment or step value may be specified in accordance with the desired minimum collision rate.

As described elsewhere herein, let the inclusive range of integers 0 ... n−1 represent the "n" possible extent values, or range of values possible for an extent pointer. In an embodiment, memory may be organized into banks, each memory bank having a particular number of extents. The number "n" refers to the total number of extents in all the memory banks. In one embodiment, each value in the range may correspond to a different memory bank pointer. In this example, "n" is an integer that is large and even. More detail about the size of "n" is described elsewhere herein in following paragraphs.

A unique extent increment or step value may be selected for each processor. One technique described in following paragraphs selects a prime number "$P_i$" as the step or increment for each processor, i, in which each "$P_i$" is a prime number such that "n" is not divisible by any "$P_i$" selected for each processor. Processing is performed such that each time a processor needs to obtain a free slot, for example, the processor, i, begins at the address or location associated with the next multiple of its prime number "$P_i$". It should be noted that operations of adding successive increments of "$P_i$" are performed "mod n" using the mathematical modulus function keeping the result within the inclusive range of values (0..n−1).

Figure 13:
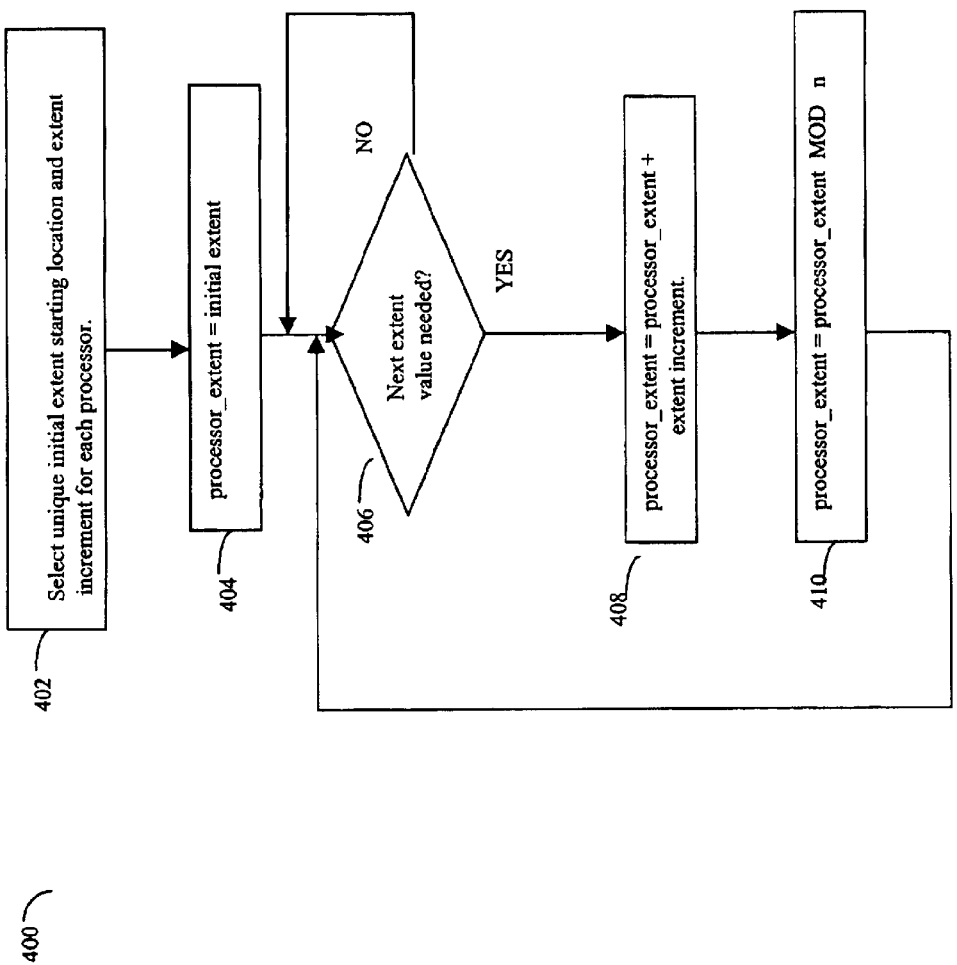
FIG. 13 is a flowchart of steps of an embodiment for determining and using extent increments.

Referring now to FIG. 13, shown is a flowchart 400 of steps of an embodiment for determining and using extent increments. At step 402, an initial extent value and extent increment are determined for each processor. In one embodiment, both of these values are unique per processor values. Techniques for determining initial extent values for each processor are described elsewhere herein. At step 404, each processor's extent is assigned its unique initial_extent. At step 406, a determination is made as to whether a next extent value is needed for the processor. If so, control proceeds to step 408 where the extent increment is added to the current value of processor_extent. Otherwise, control waits at step 406 until there is a need for determining the next updated processor_extent value. Control proceeds from step 408 to step 410 where the mathematical MOD or modulus function is performed such that the processor extent value is divided by "n", the number of extents. The remainder is assigned to processor_extent. Control proceeds to step 406.

In selecting each "$P_i$", the technique used herein cycles through or exhausts each value in the range of 0..n-1, inclusively, before selecting a value in the range, such as 0, a second time. Consider the following in which each successive processor_extent, Xnew, for a particular processor, i, is some multiple of "$P_i$" (the extent increment or step for the processor) added to the initial value of processor_extent, Xinit. This may be represented as:

$$Xinit+kP_i=Xnew$$

where "k" is an integer constant such that each time a new extent value is needed, some multiple "k" of the primary number for the extent increment "$P_i$" is added to the initial extent value Xinit. The remainder of Xnew divided by "n" is then determined with the modulus function:

$$[Xinit +kP_i]MOD\ n=Xnew$$

such that:

$$Xinit +kP_i 32\ K'n+Xnew$$

where "K'" is some integer such that "K'n" is a constant representing a multiple of "n" and the remainder Xnew. If Xinit=Xnew, such as is the case when all the values in the range, 0..n-1, have been cycled through and computed, then:

$$kP_i=K'n$$

Since $P_i$ does not divide n, then $P_I$ must be a divisor of K':

$$k=(K'/P_i)n=Kn$$

indicating that k is a multiple of n when any value within the range of (0 . . . n−1) is repeated. Accordingly, before a single value in the inclusive range (0 . . . n−1) is repeated, each and every value in the range is cycled through.

In selecting the prime number, "$P_i$", representing an ith processor's unique extent increment, the following conditions hold true in one embodiment regarding all prime numbers, $P_i$, selected:

| | |
|---|---|
| each selected "$P_i$" ≥ minimum prime number value, MIN | (CONDITION 1A) |
| n is not divisible by any $P_i$, for all $P_i$ selected for each processor "i" | (CONDITION 2A) |
| $P_i$ is unique for each processor i | (CONDITION 3A) |
| For every i, [$n≥2*P_i$] | (CONDITION 4A) |

Alternatively, in an embodiment in which "n" is not sufficiently large to meet CONDITION 4A above, an embodiment may have the following hold true rather than CONDITIONS 1A–4A above in which each processor i, has an increment $k_i$ selected such that:

| | |
|---|---|
| $n>k_i≥MIN$ | (CONDITION 1B) |
| $k_i$ does not have to be prime | (CONDITION 2B) |
| for the set of all factors or divisors, of $k_i$ and (n−$k_i$), all such factors, F, are greater than MIN | (CONDITION 3B), | and

| | |
|---|---|
| each such factor, F, in the set is unique with respect to each member of all other sets of factors of other increments | (CONDITION 4B). |

In other words, for CONDITION 4B, for every pair or processors i and j, no factor $f_i$ of an increment, $k_i$, in the set $F_I$ of CONDITION 3B above is also a factor included in another set, $F_j$ of CONDITION 3B above associated with a second different increment $k_j$.

It should be noted that "n" is also specified as being even in connection with CONDITIONS 1B–4B above.

The foregoing techniques may be used in cache initialization. A data storage system, such as the Symmetrix data storage system, may utilize one or more ring-like cache structures of FIG. 3. Each of these cache structures may be initialized upon starting the memory storage system. Each processor within the data storage system may select a predetermined number of slots beginning at a first extent or bank to be included in its' cache. Subsequently, the processor advances to the next extent increment and may select a predetermined number of slots.

Figure 14:
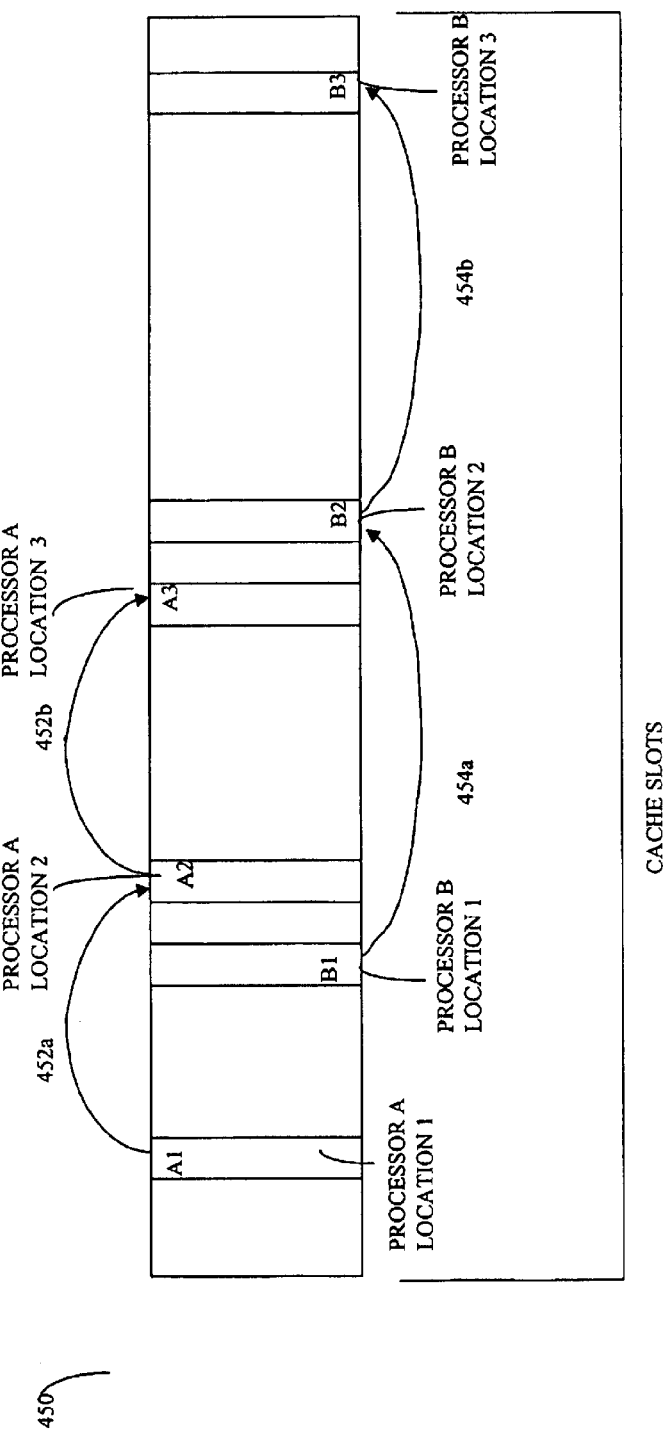
FIG. 14 is an example of an embodiment of cache slots available and used by different processors within the data storage system of FIG. 1.

Referring now to FIG. 14, shown is an example of an embodiment 450 of the slots available and used by different processors within a data storage system. As part of initialization within the data storage system, the caches forming a ring-like structure as in FIG. 3, or other equivalent, are initialized. A first processor "A" having a first cache initially begins at extent A1. Processor A selects a predetermined number of slots beginning at this location A1 and then advances its extent pointer a predetermined amount based on its unique prime number increment "P1" to the new extent location A2 and includes the next predetermined amount in its cache. Processor A then advances its extent pointer to the next location A3, and so on, including a predetermined number of cache slots beginning at the new extent location each time. Similarly, another processor, Processor "B", has an initial extent pointer value of B1 and, by adding its unique prime number extent increment, advances to B2, B3 and so on and includes a predetermined number of slots at each point into its cache.

It should be noted that although FIG. 14 and the extent increment are described referencing an embodiment including CONDITIONS 1A–4A described elsewhere herein, each processor may also utilize an extent increment which is not prime in accordance with the alternate CONDITIONS 1B–4B above.

The foregoing techniques provide for initializing the cache and also selecting portions of each cache from various memory banks such that members of each cache are initially distributed throughout memory.

The foregoing techniques may also be used in connection with operations that iterate through memory, such as, for example, when testing memory. Using the techniques of assigning extent increments to each processor, each processor may cycle through and test various portions of memory in steps in accordance with its extent increment. In particular, referring back to FIG. 14, each processor may test those memory banks or other corresponding memory portions in accordance with a current extent pointer associated with each processor. Subsequently, the current pointer associated with a processor is incremented by its extent increment. The processor then tests the next designated portion of memory beginning at the updated pointer location.

As also described herein, the foregoing techniques for extent increments may be used in connection with the TBC. In particular, at step 210 of FIG. 9, flowchart 200, if a slot has not been located when a free slot is requested, the next extent of tags is obtained at a new starting location. The new starting location may be determined by adding the extent increment value to the current starting location by using the logic at steps 406, 408 and 410 of flowchart 400 of FIG. 13. This provides the advantage of minimizing the number of collisions between any two processors or directors looking for an available slot.

In one embodiment, each processor or director may include a copy of machine executable code that determines the extent increments for all directors. The code may initialize an array of extent increment values with one element corresponding to each director. The director may store the array of values, and access its own particular value using its unique index into the array. Following is an example of a representation of the machine executable code that may be included in each director for initializing a copy of an array of extent increments:

```
curr_dir = 0;
x = initial_extent_increment;
while (curr_dir != number_of_directors)
{
    x = getnext_k(x)
    extent_increment_array[curr_dir] = x;
    curr_dir ++;
}
```

The same copy of machine executable code may be executed by each director as part of initialization. Each director may then access its extent increment in the array extent_increment$_{array}$.

The array and the copy of machine executable code may be stored in memory local to each director. Each director may have an associated identifier or index into the array. This index value may also be stored in a portion of the processor's local memory and may also be assigned as part of initialization processing. The above routine getnext_k determines the next extent increment value in accordance with the set of conditions of a particular embodiment.

Figure 15:
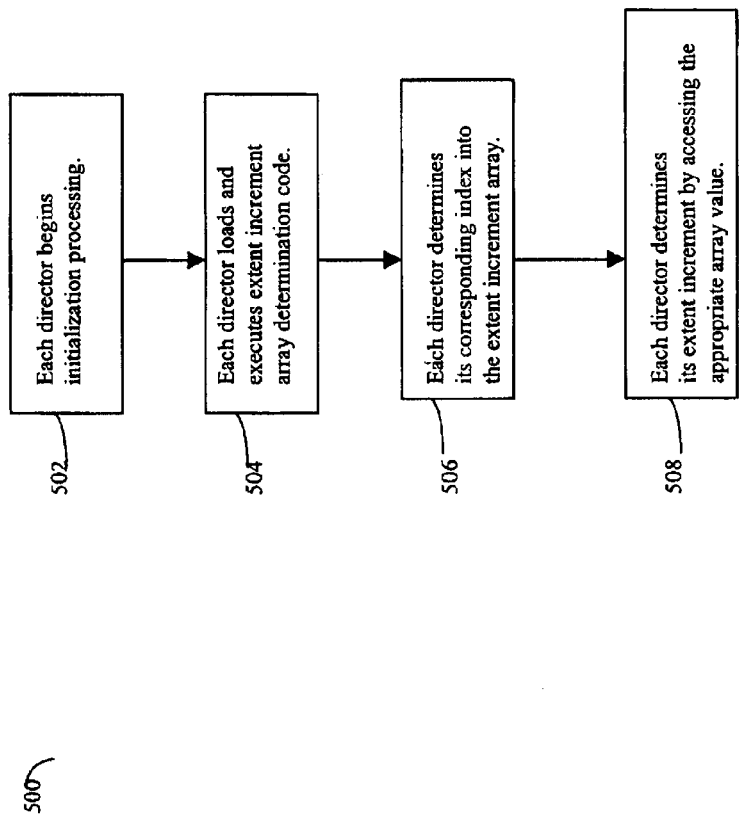
FIG. 15 is a flowchart of processing steps of an embodiment for determining extent increments as part of initialization by a director.

The foregoing steps are summarized in the flowchart of FIG. 15.

Referring now to FIG. 15, shown is a flowchart 500 of processing steps of an embodiment for determining extent increments as part of initialization by a director. At step 502, each director performs its own initialization processing, such as in connection with initializing a data storage system. At step 504, as part of the initialization processing, each director loads and executes the same copy of machine executable code to determine an array of extent increments, one extent increment per director. At step 506, each director determines its corresponding index into the array of extent increments. This may be a processor or director identifier number also assigned to each director as part of initialization and configuration. At step 508, each director determines its extent increment by accessing its appropriate element of the extent increment array. This may be done at runtime, for example, when determining the next free slot with the TBC. It should be noted that data structures other than arrays may be used in connection with storing the increment extent values. Additionally, a director may also access its value from the array, perhaps as part of initialization processing, and store it in another location for subsequent uses.

Rather than have each director have a local copy of the above-referenced representation of machine executable code and a local copy of the array of extent increments, an embodiment may also have a master director. As part of initialization of the data storage system, such as the Symmetrix data storage system, the master director may execute a copy of the above-referenced representation of machine executable code and subsequently communicate to each other director the particular corresponding extent increment. These extent increment values may be communicated by a message sent from master director to each of the other directors as part of initialization. Alternatively, the master director may also post these values in a portion of global memory accessible for read access by all other directors. Each of the other directors may read its own extent increment value from this global memory location as later processing step in initialization, for example. Each director may then store its own extent increment locally for its later use.

Figure 16:
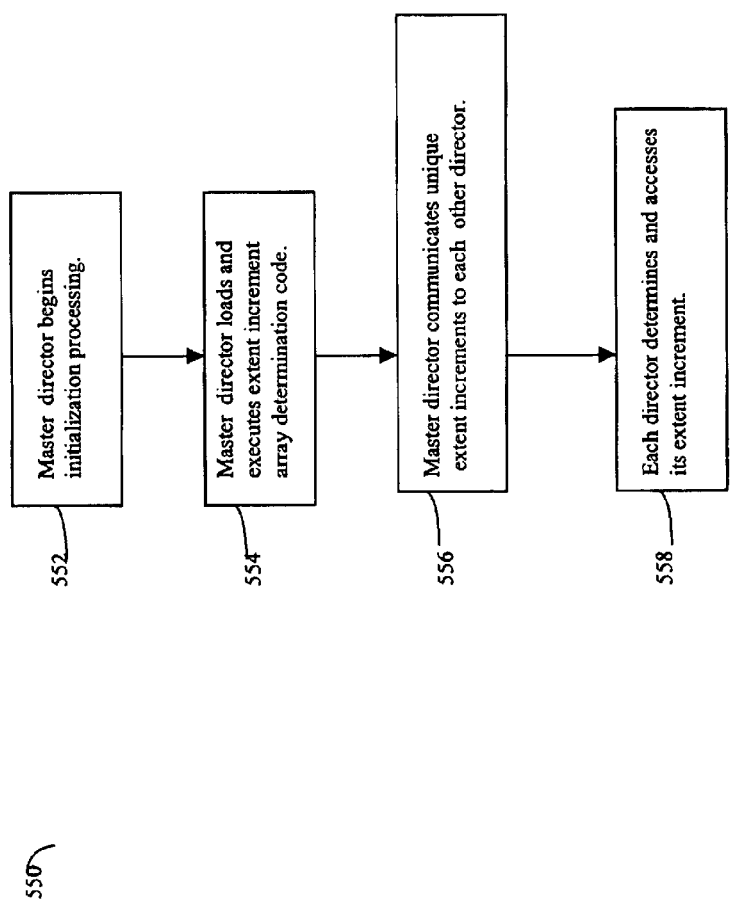
FIG. 16 is a flowchart of processing steps of another embodiment for determining extent increments for each processor using a master director.

FIG. 16 summarizes the foregoing processing steps in connection with a master director.

Referring now to FIG. 16, shown is a flowchart 550 of processing steps of another embodiment for determining extent increments for each processor using a master director. At step 552, the master director begins its initialization processing. At step 554, the master director loads and executes the extent increment array determination code as described elsewhere herein. At step 556, the master director communicates the unique extent increments to each other director. At step 558, each director accesses its unique extent increment value. This value may be communicated by the master director to each other director via a message, or stored in a globally accessible area and then accessed subsequently by each other director by reading the processor's extent increment value from the globally accessible area.

It should be noted that an embodiment may have multiple master directors which determine increment extent values for a predetermined portion of directors. An embodiment may also use a combination of the foregoing techniques in determining increment extent values and how they are used in an embodiment that may vary in accordance with each embodiment. For example, as described elsewhere herein, an embodiment may include a switch for alternating between different caching techniques, such as the queue-type cache of FIG. 3 and the TBC. Each of these caching techniques may also utilize different combinations of the techniques described herein. Additionally, independent of the types of caching employed, an embodiment may test memory using the technique described herein and also utilize the TBC with the extent increment in determining the extent or bank pointers for each director.

As an example of the foregoing, in one embodiment, the minimum prime number, "P", is 11, the number of banks is within the range of 10,000 to 50,0000 and advancing one extent increment "unit" corresponds to advancing to the next memory bank. That is, each extent increment corresponds to one memory bank. Other embodiments may select other parameters and values that vary in accordance with the particulars of each embodiment.

It should be noted that the extent increments utilized herein may be precalculated. For example, the routine getnext_k may return the next extent increment of a pre-calculated set of extent increments. The number of extent increments returned may depend on the number of times the routine is invoked. A maximum number of extent increments may be precalculated. Accordingly, the extent increments are not calculated during initialization processing, for example. An embodiment, however, may also choose to perform the calculations of extent increments at initialization time by also including and executing machine executable instructions to perform such calculations.

The various parameters, such as the number of extent increments, "n", the director or processor identifiers, the particular array element associated with each processor or director, and the like may be specified as part of initialization processing. Values for these parameters may be specified, for example, as part of system configuration data which is read upon initializing the data storage system, such as the Symmetrix data storage system described herein. Similarly, values for these parameters may also be modified by updating the system configuration file and reloading the data stored therein, or through other utilities that may be included in an embodiment, such as a utility providing for dynamic updating of parameter values which may or may not modify the definitions stored within a configuration file. The particular techniques used in connection with specifying and/or modifying values described herein may vary in accordance with each embodiment.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining a plurality of increment values associated with a predetermined range of values for a plurality of processors comprising:

determining a plurality of unique values, each of said plurality of unique values being one of: greater than or equal to a predetermined minimum value, said predetermined range being represented from "0" to "n−1" inclusively;

each of said plurality of unique values being one of:
a prime number with respect to "n" such that "n" is not divisible by any one of said plurality of unique values, "n" being one of: greater than or equal to twice said prime number, or
a value "k" having an associated set of factors of "k" and "n−k" such that each factor in said set is greater than said predetermined minimum value and each of said factors is unique with respect to every other factor of all other sets of factors associated with all others of said plurality of unique values, "k" being less than "n"; and for each of said plurality of processors, determining a location associated with said each processor in accordance with one of said plurality of unique values.

2. The method of claim 1, wherein "n" is even.

3. A method for determining a plurality of increment values associated with a predetermined range of values for a plurality of processors comprising:

determining a plurality of unique values, each of said plurality of unique values being one of: greater than or equal to a predetermined minimum value, said predetermined range being represented from "0" to "n−1" inclusively:

each of said plurality of unique values being one of:
a prime number with respect to "n" such that "n" is not divisible by any one of said plurality of unique values, "n" being one of: greater than or equal to twice said prime number, or
a value "k" having an associated set of factors of "k" and "n−k" such that each factor in said set is greater than said predetermined minimum value and each of said factors is unique with respect to every other factor of all other sets of factors associated with all others of said plurality of unique values, "k" being less than "n"; and associating each of said plurality of unique values with a different one of said plurality of processors.

4. The method of claim 3, further comprising, for each of said plurality of processors:

selecting a starting location; and
determining an updated location by adding a unique one of said increment values associated with said each processor to said starting location.

5. The method of claim 4, wherein, for each processor, said starting location and said updated location each specify a different memory location, and the method further comprising:

including in a cache at least one element associated with said starting location and at least one element associated said updated location in a cache.

6. The method of claim 5, wherein said including in a cache is performed as a part of initializing a data storage system included in said computer system.

7. The method of claim 4, wherein, for each processor, said starting location and said updated location each specify a different memory location, and the method further comprising:

determining whether a memory location beginning at said starting location is available for use with a new entry to be included in a cache, wherein said determining said updated location is performed when said memory location is not available for use.

8. The method of claim 7, further comprising:

determining whether a memory location beginning at said updated location is available for use with a new entry to be included in said cache.

9. The method of claim 4, wherein, for each processor, said starting location and said updated location each specify a different memory location, and the method further comprising:

each processor testing memory at said starting location and said updated location.

10. The method of claim 9, wherein said each processor testing memory is performed as a part of initializing a data storage system included in said computer system.

11. The method of claim 4, further comprising:

specifying a minimum collision rate, "t", between any two of said plurality of processors, a first of said plurality of processors being associated with a first increment a first starting location, and a first cumulative location represented as first cumulative location=first starting location+(first increment *t), and a second of said plurality of processors being associated with a second increment, a second starting location, and a second cumulative location represented as second cumulative location=second starting location+(second increment*t). wherein said first cumulative location and said second cumulative location are equal.

12. The method of claim 4, further comprising:

performing a mathematical modulus function upon a value associated with said updated location producing a remainder; and
assigning said remainder to said mathematical modulus.

13. The method of claim 3, further comprising:

each of said plurality of processors determining said plurality of unique values; and
each of said plurality of processors determining which one of said plurality of unique values is associated with said each processor.

14. The method of claim 13, further comprising:

each of said plurality of processors executing a same set of machine executable code.

15. The method of claim 14, wherein each processor stores in a local memory said same set of machine executable code and said plurality of unique values.

16. The method of claim 3, wherein a first of said plurality of processors is a master director, said master director performing:

determining said plurality of unique values; and
communicating to each of said other plurality of processors at least one of said plurality of unique values.

17. The method of claim 16, further comprising:
communicating, by said master director, all of said plurality of unique values by storing said plurality of unique values in a portion of memory readable by each of said other plurality of processors.

18. The method of claim 16, further comprising:
communicating, by said master director, a single one of said unique values to each of said other plurality of processors.

19. A method for determining a plurality of increment values associated with a predetermined range of values for a plurality of processors comprising:
determining a plurality of unique values, each of said plurality of unique values being one of: greater than or equal to a predetermined minimum value, said predetermined range being represented from "0" to "n−1" inclusively;
each of said plurality of unique values being one of:
a prime number with respect to "n" such that "n" is not divisible by any one of said plurality of unique values, "n" being one of: greater than or equal to twice said prime number, or
a value "k" having an associated set of factors of "k" and "n−k" such that each factor in said set is greater than said predetermined minimum value and each of said factors is unique with respect to every other factor of all other sets of factors associated with all others of said plurality of unique values. "k" being less than "n"; and
wherein each of said plurality of unique values are increment values in units such that a single unit corresponds to a different memory bank.

20. A computer program product for determining a plurality of increment values associated with a predetermined range of values for a plurality of processors comprising:
machine executable code that determines a plurality of unique values, each of said plurality of unique values being one of: greater than or equal to a predetermined minimum value, said predetermined range being represented from "0" to "n−1" inclusively;
each of said plurality of unique values being one of:
a prime number with respect to "n" such that "n" is not divisible by any one of said plurality of unique values, "n" being one of: greater than or equal to twice said prime number, or
a value "k" having an associated set of factors of "k" and "n−k" such that each factor in said set is greater than said predetermined minimum value and each of said factors is unique with respect to every other factor of all other sets of factors associated with all others of said plurality of unique values, "k" being less than "n"; and
machine executable code that, for each of said plurality of processors, determines a location associated with said each processor in accordance with one of said plurality of unique values.

21. The computer program product of claim 20, wherein "n" is even.

22. A computer program product for determining a plurality of increment values associated with a predetermined range of values for a plurality of processors comprising:
machine executable code that determines a plurality of unique values, each of said plurality of unique values being one of: greater than or equal to a predetermined minimum value, said predetermined range being represented from "0" to "n−1" inclusively;
each of said plurality of unique values being one of:
a prime number with respect to "n" such that "n" is not divisible by any one of said plurality of unique values, "n" being one of: greater than or equal to twice said prime number, or
a value "k" having an associated set of factors of "k" and "n−k" such that each factor in said set is greater than said predetermined minimum value and each of said factors is unique with respect to every other factor of all other sets of factors associated with all others of said plurality of unique values, "k" being less than "n"; and
machine executable code that associates each of said plurality of unique values with a different one of said plurality of processors.

23. The computer program product of claim 22, further comprising, for each of said plurality of processors:
machine executable code that selects a starting location; and
machine executable code that determines an updated location by adding a unique one of said increment values associated with said each processor to said starting location.

24. The computer program product of claim 23, wherein, for each processor, said starting location and said updated location each specify a different memory location, and further comprising machine executable code that includes in a cache at least one element associated with said starting location and at least one element associated said updated location in a cache.

25. The computer program product of claim 24, wherein said including in a cache is performed as a part of initializing a data storage system included in said computer system.

26. The computer program product of claim 23, wherein, for each processor, said starting location and said updated location each specify a different memory location, and the computer program product further comprising:
machine executable code that determines whether a memory location beginning at said starting location is available for use with a new entry to be included in a cache, wherein said determining said updated location is performed when said memory location is not available for use.

27. The computer program product of claim 26, further comprising:
machine executable code that determines whether a memory location beginning at said updated location is available for use with a new entry to be included in said cache.

28. The computer program product of claim 23, wherein, for each processor, said starting location and said updated location each specify a different memory location, and the computer program product further comprising:
machine executable code for each processor testing memory at said starting location and said updated location.

29. The computer program product of claim 28, wherein said each processor testing memory is performed as a part of initializing a data storage system included in said computer system.

30. The computer program product of claim 23, further comprising:
machine executable code that specifies a minimum collision rate, "t", between any two of said plurality of processors, a first of said plurality of processors being associated with a first increment, a first starting location. and a first cumulative location represented as first cumulative location=first starting location+(first increment*t), and a second of said plurality of processors being associated with a second increment, a second starting location, and a second cumulative location represented as second cumulative location=second starting location+(second increment*t), wherein said first cumulative location and said second cumulative location are equal.

31. The computer program product of claim 23, further comprising:

machine executable code that performs a mathematical modulus function upon a value associated with said update location producing a remainder; and machine executable code that assigns said remainder to said mathematical modulus.

32. The computer program product of claim 22, further comprising:

machine executable code that causes each of said plurality of processors to determine said plurality of unique values; and machine executable code that causes each of said plurality of processors to determine which one of said plurality of unique values is associated with said each processor.

33. The computer program product of claim 32, further comprising:

a same set of machine instructions included in each of said plurality of processors.

34. The computer program product of claim 33, wherein each processor stores in a local memory said same set of machine executable code and said plurality of unique values.

35. The computer program product of claim 22, wherein a first of said plurality of processors is a master director, said master director including machine executable code that:

determines said plurality of unique values; and communicates to each of said other plurality of processors at least one of said plurality of unique values.

36. The computer program product of claim 35, further comprising:

machine executable code that communicates, by said master director, all of said plurality of unique values by storing said plurality of unique values in a portion of memory readable by each of said other plurality of processors.

37. The computer program product of claim 35, further comprising:

machine executable code that communicates, by said master director, a single one of said unique values to each of said other plurality of processors.

38. A computer program product for determining a plurality of increment values associated with a predetermined range of values for a plurality of processors comprising:

machine executable code that determines a plurality of unique values, each of said plurality of unique values being one of: greater than or equal to a predetermined minimum value, said predetermined range being represented from "0" to "n−1" inclusively;

each of said plurality of unique values being one of:

a prime number with respect to "n" such that "n" is not divisible by any one of said plurality of unique values, "n" being one of: greater than or equal to twice said prime number, or a value "k" having an associated set of factors of "k" and "n−k" such that each factor in said set is greater than said predetermined minimum value and each of said factors is unique with respect to every other factor of all other sets of factors associated with all others of said plurality of unique values, "k" being less than "n"; and wherein each of said plurality of unique values are increment values in units such that a single unit corresponds to a different memory bank.

* * * * *